United States Patent [19]

Kim

[11] Patent Number: 4,810,741
[45] Date of Patent: Mar. 7, 1989

[54] FIRE-RESISTANT MATERIAL, NONCOMBUSTIBLE MATERIAL FOR TREATING INTERIOR BUILDING MATERIAL AND PROCESSES FOR THEIR PRODUCTION

[76] Inventor: Jae W. Kim, 408-508, Jugong 4th Apartment, 896 Maetan-dong, Suwon, Kyunggi-do, Rep. of Korea

[21] Appl. No.: 90,150
[22] PCT Filed: Dec. 3, 1986
[86] PCT No.: PCT/KR86/00020
§ 371 Date: Aug. 3, 1987
§ 102(e) Date: Aug. 3, 1987
[87] PCT Pub. No.: WO87/03612
PCT Pub. Date: Jun. 18, 1987

[30] Foreign Application Priority Data

Dec. 3, 1985 [JP] Japan ................. 60-272215

[51] Int. Cl.$^4$ ................. C08K 3/38
[52] U.S. Cl. ................. 524/405; 252/606; 252/608; 252/609; 428/920; 428/921; 523/179; 524/416; 524/436; 524/493; 524/494
[58] Field of Search ............... 523/179; 428/921, 920; 524/405, 416, 493, 494, 436; 106/18.13, 18.16, 18.26; 252/606, 608, 609

[56] References Cited

U.S. PATENT DOCUMENTS

| | | | |
|---|---|---|---|
| 2,078,197 | 4/1937 | Hooker et al. | 252/608 |
| 2,809,949 | 10/1957 | Orth | 524/405 |
| 3,249,534 | 5/1966 | Ware | 524/405 |
| 3,510,446 | 5/1970 | Junger et al. | 428/920 |
| 4,386,119 | 5/1983 | Draganov | 428/921 |
| 4,521,333 | 6/1985 | Graham et al. | 428/921 |

FOREIGN PATENT DOCUMENTS 51-80336 7/1976 Japan.
53-124539 10/1978 Japan.

OTHER PUBLICATIONS

Bhatnagar, V. M., Fire Retardant Formulations Handbook–vol. 1, p. 198 (1972).

*Primary Examiner*—Veronica P. Hoke
*Attorney, Agent, or Firm*—Saidman, Sterne, Kessler & Goldstein

[57] ABSTRACT

A fire-resistant material which is produced by mixing, in a predetermined ratio, agent A prepared by diluting a liquid mixture of calcium chloride and boric acid with water, agent B comprising silicone resin, sodium silicate, and polyvinyl acetate resin and agent C comprising ammonium monophosphate silica gel. A noncombustible material for treating interior building materials which is produced by mixing the above- described fire-resistant material with a mixture of powder D prepared by grinding and drying a mixture of an aqueous boric acid solution and an adhesive aqueous solution of paper powder, an earth/rock powder prepared by reducing and heating loess, sand, waste coal, and diatomite powder.

The noncombustible material can be sprayed over or appiled on combustible materials such as wood, textiles, paper, plastics, etc. to make them noncombustible and, upon starting of a fire, it foams to form an insulating layer which exhibits a sufficient heat-insulating effect and neutralizes and controls toxic gases.

4 Claims, No Drawings

FIRE-RESISTANT MATERIAL, NONCOMBUSTIBLE MATERIAL FOR TREATING INTERIOR BUILDING MATERIAL AND PROCESSES FOR THEIR PRODUCTION

TECHNICAL FIELD

The present invention relates to fire-resistant material and noncombustible material for being applied on interior building materials by spraying or brushing and the processes for their production.

BACKGROUND ART

Various fire-proof, heat-insulating or adiabatic materials are conventionally used in the construction of building. Some examples are stone, plaster board, asbestos and fiberglass. There are also many conventional treatments used for the existing buildings to make combustible materials fire-proof or fire-resistant.

However, installing or replacing these materials has many disadvantages. Replacement is often costly because of materials and labor and sometimes it requires a structural change or even destruction of some parts of the building. Treatments to make combustible materials fire-proof or fire-resistant are effective to an extent, but cannot make entire existing building interior noncombustible. Moreover, fire causes many of these treated materials to produce toxic gases, endangering human lives.

DISCLOSURE OF INVENTION

It is the object of the present invention to produce fire-resistant material and noncombustible material which can be used to treat materials without destroying or removing parts of the existing building and also do not produce toxic gases when a fire breaks out, avoiding the problems of currently used materials.

In the present invention, a fire-resistant material is made by mixing the following: agent A, a solution of calcium chloride and boric acid diluted in water; agent B, a mixture of silicone resin, sodium silicate and polyvinyl acetate Resin; and agent C, a mixture of Ammonium mono Phosphate and silica gel.

Agent A should be made by mixing the calcium chloride and Boric Acid at a ratio of 1:1 and then diluting this mixture in 1 to 2 times as much water. This solution acts to prevent the ignition of a treated material, and also prevents cracks on the surface of the treated material as the fireproof material layer dries after being sprayed on.

Agent B should be made by mixing 35% to 45% of silicone resin, 35% to 45% of sodium silicate, and 10% to 30% of polyvinyl acetate Resin and then reducing this mixture to a powder of 200 to 450 mesh. This mixture adds to the adhesiveness of the present invention and produces an insulating foam layer when exposed to high temperatures.

Agent C is made by mixing Ammonium mono Phosphate and silica gel, melting it by applying heat and reducing it to a powder. It promotes the heat-resisting property of the material according to the present invention and also neutralizes any toxic gases produced by fire. It should be made by mixing 50% to 70% of Ammonium mono Phosphate with 30%–50% of silica gel, reducing it to a powder of 250 to 450 mesh and heating in the range of 800° C. to 1000° C.

The fire-resistant material in the present invention can be produced through the following method; step one, agent A is prepared by diluting a mixture of calcium chloride and boric acid in water; step two, agent B is made by mixing silicone resin, sodium silicate and polyvinyl acetate Resin and reducing the resultant mixture to a powder; step three, agent C is made by mixing Ammonium mono Phosphate and silica gel, heating this mixture and then reducing it to a powder; the final step involves the mixing of agents A, B and C.

In this case, agents A and B may be mixed at room temperature, then mixed with agent C, also at room temperature. Agents A and B should be mixed in a ratio of 1:1 to 2:1. The mixture of agents A and B should be mixed with agent C in a ratio of 2:1 to 3:1. The resulting fire-resistant material creates an insulating foam layer when it is treated on the material and becomes transparent when it is deposited.

The noncombustible material for interior building materials of this invention can be produced by mixing the above-described fire-resistant material with powder D, produced by mixing boric acid solution and paper powder, reduced and dried; and earth/rock powder, made by grinding loess, sand and waste coal and heating it; and Diatomite powder.

The boric acid solution should be made by mixing 10% to 25% of Boric Acid and 75% to 90% of water, and this solution should be mixed with a paper powder at a ratio of 1:3 to 1:6 ground to make a powder of 200 to 450 mesh, then heated for 30–120 minutes. This boric acidified paper of powder D, a fibrous material, prevents cracks in the noncombustible material layer and thus keeps a fire from spreading. Old newspapers and magazines may be used for this purpose.

For the earth/rock powder, loess, sand and waste coal should be mixed at the same ratio, reduced to a powder of 200 to 450 mesh, mixed with 10% to 20% of water, heated at 800° C. to 1200° C. for 3 to 6 hours, then ground again to 200 to 450 mesh. Because the earth/rock powder is produced at high temperatures, it prevents the spreading of fire and excels in the property of heat insulation.

Said powder D, diatomite powder and the earth/rock powder should be mixed in a ratio of 20%–30%: 25%–35%: 35%–55%. Then the resultant mixture should be mixed with the above foaming fire-resistant material in a ratio 1:1 to 2:1. This mixture is deposited with heating at 30° C. to 80° C. for 1 to 2 hours, and then filtered to have a particle size of 200 to 450 mesh. Dyes can then be added to give the present invention a desired color.

BEST MODES FOR CARRYING OUT THE INVENTION

A preferred embodiment of the present invention will be described in detail with reference to various examples below.

Example 1

Process 1. Agent A was made by mixing calcium chloride and boric acid in a ratio of 1:1 and then diluting this mixture in 1.5 times as much water.

Process 2. Agent B was made by mixing 40% of silicone resin, 40% of sodium silicate and 20% of polyvinyl acetate Resin, reducing this mixture by the grinder with a velocity of 800 rpm and then filtering this mixture to produce a powder of 300 mesh.

Process 3. Agent C was made by mixing 60% of Ammonium mono Phosphate and 40% of silica gel, melting it by applying heat of 800° C. and then reducing it to have a powder of 300 mesh.

Process 4. Powder D was made by three steps; first, old newspapers were reduced to a powder and added to water of a proper amount and then heated with steam to make a viscous paper solution; second, boric acid solution was prepared by mixing 20% of boric acid and 80% of water and added to the paper solution which has a cubic volume four times as much as boric acid solution; and third, the resulting solution was reduced to a powder of 300 mesh, heated with steam and then dried.

Process 5. Earth/rock powder was obtained by mixing loess, sand and waste coal in the same cubic ratio, grinding the mixture to a powder of 300 mesh, mixing it with 10% of water, heating at 900° C. for five hours and then reducing it to a powder of 400 mesh.

Process 6. Agent A and agent B were mixed in a ratio of 1:1 and this mixture and agent C were mixed in a ratio of 2:1.

The mixture of 25% of powder D, 25% of diatomite powder and 50% of earth/rock powder was mixed with 30% of water, and this solution was mixed with the above mixture of agent A, B and C in a ratio of 1:1.

The noncombustible material of the present invention was made by heating the above resultant mixture at 50° C. for 2 hours and then filtering it to a powder of over 300 mesh.

Examples 2 and 3

In process 1, the solution of calcium chloride and boric acid was mixed with water in two different ratios as 1:1 and 1:2, respectively. The results were the same as Example 1.

Examples 4, 5 and 6

Other processes were the same as in Example 1 except for process 2, in which silicone resin, sodium silicate and Polyvinyl Acetate Resin were mixed in three different ratios in the range of 35%–45%: 35%–45%: 10%–30%, respectively. The results were the same as Example 1.

Examples 7, 8 and 9

Other processes were the same as in Example 1 except for process 3, in which Ammonium mono Phosphate and silica gel were mixed in three different ratios in the range of 50%–70%: 30%–50%, respectively. The results were the same as Example 1.

Examples 10, 11 and 12

In process 3 of Example 1, the mixture of Ammonium mono Phosphate and silica gel was reduced to in three different sizes in the range of 200–450 mesh, respectively. The results were the same as Example 1.

Examples 13 and 14

Other processes were the same as in Example 1 except for process 3, in which the powder was heated in two different temperatures at 900° C. and 1000° C., respectively. The same agent C as in Example 1 was obtained.

Examples 15, 16 and 17

Other processes were the same as in Example 1 except for process 4, in which boric acid and water were mixed in three different ratios in the range of 10%–25%: 75%–90%, respectively. The results were the same as Example 1.

Examples 18, 19 and 20

In process 4 of Example 1, the paper powder solution was added to boric acid solution in three different ratios in the range of 3:1, 5:1 and 6:1, respectively. The results were the same as Example 1.

Examples 21 and 22

In process 4 of Example 1, the solution of boric acid and paper powder was heated for 30 minutes and 2 hours, respectively. The results for both examples were the same as Example 1.

Examples 23 and 24

In process 4 of Example 1, the powder was reduced to two different sized particles of 200 and 450 mesh, respectively. The same agent C as in Example 1 was obtained.

Examples 25, 26 and 27

Other processes were the same as in Example 1 except for process 5, in which the mixture of loess, sand and waste coal was reduced to three different sized particles of 200 to 450 mesh, respectively. The results were the same as Example 1.

Example 28

In process 5 of Example 1, the amount of water added to the powder was changed in several different ratios from 10%–20%, the result were the same as Example 1.

Example 29

In process 5 of Example 1, the heating time was changed to 3, 4 and 6 hours, respectively. The results were the same as Example 1.

Examples 30, 31 and 32

In process 5 of Example 1, the heating temperature was changed in three different degrees in 800° C.–1200° C., respectively. The results were the same as Example 1.

Examples 33, 34 and 35

In process 5 of Example 1, heating mixture was reduced to three different sized particles of 200–450 mesh, respectively. The results were the same as Examples 25, 26 and 27.

Example 36

Other processes were the same as Example 1 except for 6, in which the mixing ratio of agent A and agent B was changed to 2:1. The result was the same as Example 1.

Example 37

In process 6 of Example 1, the mixture of agent A and B was mixed with agent C in a ratio of 3:1. The result was the same as Example 1.

Examples 38, 39, 40, 41, 42 and 43

In process 6 of Example 1, powder D, diatomite powder and earth/rock powder were mixed in six different ratios in the range of 20%–30%: 25%–35%: 35%–55%, respectively. The results were the same as Example 1.

Example 44

In process 6, powder D, diatomite powder and earth/rock powder were mixed in the same ratio as Example 1, and 20% of water was added. This solution was mixed with the mixture of agent A, B and C in a ratio of 1:2, heated at 50° C. for 2 hours and then filtered to make a powder of over 300 mesh. The result was the same as Example 1.

Example 45, 46 and 47

In process 6 of Example 1, three different temperatures of deposition, ranging from 30° C.-80° C. were respectively adopted. The results were the same as Example 1.

Example 48

In process 6 of Example 1, the deposition proceeded for 1 hour and the result was the same as Example 1.

Examples 49, 50 and 51

In process 6 of Example 1, the mixture was filtered to three different sized powders ranging from 200 to 450 mesh. The results were the same as Example 1.

INDUSTRIAL APPLICABILITY

The noncombustible material produced by the present invention meets Korean Standards of noncombustibility for interior building materials and can be used to spray-coated combustible materials such as wood, textiles, paper and plastics to make them noncombustible. Said treated materials are insulated from fire because when the noncombustible material is exposed to flame the Sodium Silicate in it forms a foamy insulating layer; the Sodium Silicate also serves to neutralize any toxic gases which are produced by fire.

Noncombustibility tests according to Korean Standards are carried out on a selective basis according to noncombustibility grades provided for in the standard specifications. To receive grade A, it is required that a test item's temperature will not rise by more than 50° C. when it is heated at 750°±10° C. for 20 minutes and will not exceed 30 in calorification coefficient ($C_A$) per unit area, which is obtainable from the following formula.

The interior building materials spray-coated with the noncombustible material of the present invention meet nombombustibility standard grade A.

$$C_A = 240 \log_{10}(I_o/I)$$

$I_o$: Brightness(Lux) when heating test is begun.
$I$: Minimum value of brightness (Lux) during heating test is given.

I claim:

1. A fire-resistant material which is produced by mixing the following in a certain ratio:
   agent A, which is made by diluting a 1:1 mixture of calcium chloride and boric acid with 1-2 times as much water;
   agent B, a publicly known mixture which is made by mixing 35%-45% silicone resin, 35%-45% sodium silicate, and 10%-30% polyvinyl acetate resin; and
   agent C, which is made by mixing 50%-70% ammonium mono phosphate and 30%-50% silica gel;
   wherein agents A and B are mixed at 1:1 to 2:1 ratio; and
   wherein the A-B mixture is mixed with agent C at a 2:1 to 3:1 ratio.

2. A noncombustible material for treating interior building materials which is made by mixing
   a fire-resistant material, a first mixture of
   agent A, which is made by diluting a 1:1 mixture of calcium chloride and boric acid with 1-2 times as much water,
   agent B, which is made by mixing 35%-45% silicone resin, 35%-45% sodium silicate, and 10%-30% polyvinyl acetate resin, and
   agent C, which is made by mixing 50%-70% ammonium mono phosphate and 30%-50% silica gel;
   wherein agents A and B are mixed at a 1:1 to 2:1 ratio; and wherein the A-B mixture is mixed with agent C at a 2:1 to 3:1 ratio;
   with a second mixture of
   powder D, which is made by reducing the adhesive solution of boric acid and paper powder at a 1:3 to 1:6 ratio, and grinding it to a powder of 200-450 mesh, and then drying it, wherein said boric acid solution is made by mixing 10% to 25% boric acid with 75% to 90% water, and wherein said adhesive solution is made adhesive mainly by virtue of the paper's fiber;
   earth/rock powder which is made by mixing loess, sand and waste coal at a 1:1:1 ratio, reduced to 200-450 mesh, mixed with 10%-20% water, and heated at 800-1200 degrees C.; and
   diatomite powder;
   wherein said powder D, diatomite powder, and earth/rock powder are mixed in a ratio of 20%-30%: 25%-35%: 35%-55%;
   wherein said first and second mixtures are mixed at a 1:1 to 1:2 ratio.

3. The production process of a fire-resistant material which includes following steps:
   first, agent A is made by mixing calcium chloride and boric acid at a 1:1 ratio and then diluting this mixture in in 1-2 times as much water;
   second, agent B is made by mixing 35%-45% silicone resin, 35%-45% sodium silicate, and 10%-30% polyvinyl acetate resin, and then reducing this mixture to a powder;
   third, agent C is made by mixing 50%-70% ammonium mono phosphate with 30%-50% silica gel, heating the mixture at 800-1000 degrees C. and reducing the mixture to a powder of 200-450 mesh;
   finally, agents A, B and C are mixed;
   wherein agents A and B are mixed at a 1:1 to 2:1 ratio, and
   wherein the A-B mixture is mixed with agent C at a 2:1 to 3:1 ratio.

4. The production process of a noncombustible material for treating interior building materials which includes following steps:
   first, agent A is made by mixing calcium chloride and boric acid at a 1:1 ratio and then diluting this mixture in 1-2 times as much water;
   second, agent B is made by mixing 35%-45% silicone resin, 35%-45% sodium silicate, and 10%-30% polyvinyl acetate resin, and then reducing this mixture to a powder;
   third, agent C is made by mixing 50%-70% ammonium mono phosphate with 30%-50% silica gel, heating the mixture and reducing the mixture to a powder;
   fourth, powder D is made by mixing a boric acid solution with a paper powder at a 1:3 to 1:6 ratio, reducing the mixture to make a powder of 200-450 mesh and then heating it for 30-120 minutes, wherein said boric acid solution is made by mixing 10%–25% boric acid with 75%–90% water;

fifth, earth/rock powder is made by mixing loess, sand and waste coal at a 1:1:1 ratio, the mixture being reduced to a powder of 200–450 mesh, mixed with 10%–20% of water and heated at 800–1200 degrees C.;

sixth, a fire-resistant material is made by mixing agent A, B and C, wherein agents A and B are mixed at 1:1 to 2:1 ratio, and wherein the A-B mixture is mixed with agent C at a 2:1 to 3:1 ratio, and the resulting first mixture of agents A, B, and C is mixed with a second mixture of powder D, diatomite powder and said earth/rock powder at a 1:1 to 1:2 ratio;

wherein said second mixture of powder D, diatomite powder and earth/rock powder is mixed in a ratio of 20%–30%: 25%–35%: 35%–55%.

* * * * *